United States Patent
Alexander et al.

(10) Patent No.: US 7,120,784 B2
(45) Date of Patent: Oct. 10, 2006

(54) THREAD-SPECIFIC BRANCH PREDICTION BY LOGICALLY SPLITTING BRANCH HISTORY TABLES AND PREDICTED TARGET ADDRESS CACHE IN A SIMULTANEOUS MULTITHREADING PROCESSING ENVIRONMENT

(75) Inventors: Gregory William Alexander, Austin, TX (US); Scott Bruce Frommer, Cold Spring, NY (US); David Stephen Levitan, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/425,064

(22) Filed: Apr. 28, 2003

(65) Prior Publication Data
US 2004/0215720 A1 Oct. 28, 2004

(51) Int. Cl.
*G06F 9/40* (2006.01)
*G06F 9/00* (2006.01)

(52) U.S. Cl. .............. 712/240; 712/238; 712/239; 712/229

(58) Field of Classification Search ........ 712/238–240, 712/229
See application file for complete search history.

(56) References Cited

U.S. PATENT DOCUMENTS

2001/0056456 A1* 12/2001 Cota-Robles ............... 709/103
2003/0004683 A1* 1/2003 Nemawarkar ............... 702/186

OTHER PUBLICATIONS

Research Disclosure, Jun. 1, 1998, UK. vol. 41, Issue 410. TDB Acc No. NNR410111.*
Hilly, S., Seznec, A. "Branch Prediction and Simultaneous Multithreading" Proceedings of PACT 1996. pp. 169-173.*
Ramsay, M., Feucht, C., Lipasti, M. "Exploring Efficient SMT Branch Predictor Design." Jun. 2003. 13 pages.*

* cited by examiner

Primary Examiner—Eddie Chan
Assistant Examiner—Dillon J. Cody (57) ABSTRACT

Branch prediction logic is enhanced to provide a monitoring function for certain conditions which indicate that the use of separate BHTs and predicted target address cache would provide better results for branch prediction. The branch prediction logic responds to the occurrence of the monitored condition by logically splitting the BHTs and count cache so that half of the address space is allocated to a first thread and the second half is allocated to the next thread. Prediction-generated addresses that belong to the first thread are then directed to the half of the array that is allocated to that thread and prediction-generated addresses that belong to the second thread are directed to the next half of the array that is allocated to the second thread. In order to split the array, the highest order bit in the array is utilized to uniquely identify addresses of the first and the second threads.

28 Claims, 7 Drawing Sheets

THREAD-SPECIFIC BRANCH PREDICTION BY LOGICALLY SPLITTING BRANCH HISTORY TABLES AND PREDICTED TARGET ADDRESS CACHE IN A SIMULTANEOUS MULTITHREADING PROCESSING ENVIRONMENT

BACKGROUND OF THE INVENTION

1. Technical Field

The present invention relates to data processing and in particular to branch prediction in data processing systems. Still more particularly, the present invention relates to a method and system for efficiently handling simultaneous multi-threaded operations within a branch prediction mechanism of a data processing system.

2. Description of the Related Art

Branch prediction within processing systems is well known in the art. When instructions are initially fetched from cache or memory for execution at the processing units, a prediction mechanism within the processing unit predicts a path that will be taken by branch instructions within the group of fetched instructions. The instructions are address operations and the path is identified by an address, referred to as a target address. When the instruction is actually executed, a check is made whether the predictions were correct.

Specific hardware and/or logic structures within the processor carry out the branch direction prediction and subsequent analysis of whether the path was correctly predicted. Some current systems utilize branch prediction logic that includes 3 branch history tables (BHTs) which store predictors for fetched branches, and a predicted target address cache (referred to hereinafter as a "count cache"), which stores predicted target addresses for some of the fetched branch instructions. One BHT, referred to as the "local predictor," is indexed by partial branch addresses. The prediction direction is associated with the address in the local predictor. The other two BHTs, "global predictor" and "selector," are indexed by a hash of the partial branch address and recent path of execution. The count cache is utilized for certain types of branch instructions whose target addresses cannot be directly computed from information in the branch instruction itself, by associating target addresses with branch institution addresses.

One improvement in data processing that affects how application instructions are executed by the processor and subsequently the reliability of branch prediction is the implementation of simultaneous multi-threading (SMT). With SMT, program applications executing on the processor are executed as one or more threads. Each thread comprises a stream of instructions. At any given time, information from multiple threads may exist in various parts of the machine. For example, with two executing threads, both threads appear to the OS as two separate processors. Each of the two threads has (or appears to the OS to have) its own copy of all the normal architected registers that a program can access and/or modify.

Often, multiple copies of the same application are executed concurrently in order to speed up the overall processing of the application on the system and ensure more efficient utilization of processor resources. When this occurs, each copy provides its own set of threads, and each thread shares similar program/instruction addresses within the memory subsystem. Branch prediction information (written to the BHTs and count cache) are also the same and can be merged. It is also common, however, for the threads executing on the processor to belong to different application and thus have different program/instruction addresses within the memory subsystem. However, the partial addresses of the instruction stored within the BHTs and the count cache may be similar resulting in some conflict at the BHTs and count cache and accuracy problems with branch prediction.

At the processor level, the addresses utilized during processing are typically effective addresses. Each of these effective addresses map to specific real addresses within the physical memory space. When the instructions are initially retrieved from memory, they are assigned an effective address. A common practice is to begin assignment of lower order bits of effective addresses for each application at a particular addresses to ensure that number of effective addresses required for operations within the processor is not excessively large. The lower order bits of effective addresses are thus utilized and re-utilized for each thread, and threads of different applications with different physical addresses are often assigned the same lower order bits of effective addresses. For example, the compiler may always start a program at the same effective address when it begins lading irrespective of whether another thread (of the same or another program) has been assigned the same effective address. Thus, in the multi-threaded environment, different threads from different applications utilizing processor resources may share the same EA's but because they map to different RAs, the threads necessarily provide very different targets and direction predictions and should not be handled in the same manner when completing way prediction.

Typically the part of the instruction address utilized to index into the BHTs and the count cache are lower order bits, which will tend to be unique for each instruction (or group of instructions in a superscalar machine) of a single application. Each BHT provides an array of 1 or 2-bit wide registers to store the predictors, and the count cache provides an array of registers the width of an instruction address. Assuming the number of lower order instructions address bits used to index into the array is x, the possible register address entries per array is $2^x$ to accommodate all possible addresses. The number of low order instruction bits used to index into the count cache need not be the same as the number of bits used to index into the BHTs.

In SMT mode, two threads share the three BHTs and the count cache. When both threads are running the same code, i.e., threads of the same application, there is an advantage to both threads sharing common BHTs and a common count cache and it is thus important that both threads be able to share BHT and count cache entries. However, when each thread is running different code, the current system by which the threads share common BHTs and common count cache may result in faulty predictions because of the overlap in addresses that may be placed within the BHTs and count cache. Within a multiple application environment this sharing of cache lines would cause some amount of thrashing within the branch prediction mechanism. Currently, there is no implementation in which way branch prediction logic can accurately ensure that prediction from within the BHTs and count cache is not faulty due to the sharing of effective address between threads of different program code.

The present invention thus recognizes that it would be desirable to provide a method, processing system, and branch prediction mechanism that substantially, eliminate faulty predictions caused by SMT operations for different program code. A method, processing system and branch prediction mechanism that enables correct way-prediction when threads of different applications share lower order effective address bits but map to different real addresses would be a welcome improvement. The invention further recognizes that it would be beneficial to provide each thread in a SMT processor the protection of its own private BHTs and count cache spaces, inaccessible to the other thread, without substantially increasing hardware or logic costs (i.e., by sharing current hardware in a non-overlapping way). These and other benefits are provided by the invention described herein.

SUMMARY OF THE INVENTION

Disclosed are a method, processing system, and branch prediction mechanism that enable thread-specific branch prediction during multithreading operations on a processor that is executing multiple threads, some of which may be tagged with the same partial effective addresses. Branch prediction is completed utilizing a set of branch history tables (BHTs) and a predicted target address cache (or count cache), which typically operate in a unified mode (i.e., sharing of all entries among both threads). Branch prediction logic is enhanced to provide a monitoring function for certain conditions which indicate that the use of separate BHTs and count cache would provide better results for branch prediction.

The branch prediction logic responds to the occurrence of that monitored condition by logically splitting the BHTs and count cache so that half of the address space is allocated to a first thread and the next half is allocated to the second thread. Prediction-generated addresses that belong to the first thread are then directed to the half of the array that is allocated to that thread and prediction-generated addresses that belong to the second thread are directed to the next half of the array that is allocated to the second thread. In order to split the array, the highest order bit in the array is utilized to uniquely identify addresses of the first and the second threads.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for enabling branch prediction logic to provide more accurate predictions when threads of different applications are running On the simultaneous multi-threading (SMT) processor. The invention provides logic for determining when the two threads running on the system are of different applications and would benefit from having separate BHTs and predicted target address cache (referred to hereinafter as a "count cache") and, responsive to tat determination, the logic logically re-configures both the BHTs and the count cache in a split mode separating the prediction addresses of each thread.

The invention solves the problem of redundancy and collisions in the BHTs and count cache of a branch prediction mechanism during SMT when both threads are from different program code. Specifically, the invention addresses the problem of shared lower order bits of effective addresses for both threads that necessarily map to different real addresses in the memory subsystem. In order to avoid the redundancy and prevent BHT and count cache collisions, the invention provides a "split-BHT" mode and a "split-count cache" mode. The split modes are dynamically enabled or disabled depending on a periodic assessment of certain conditions which indicate whether code is shared, or whether the current method is working.

Figure 1:
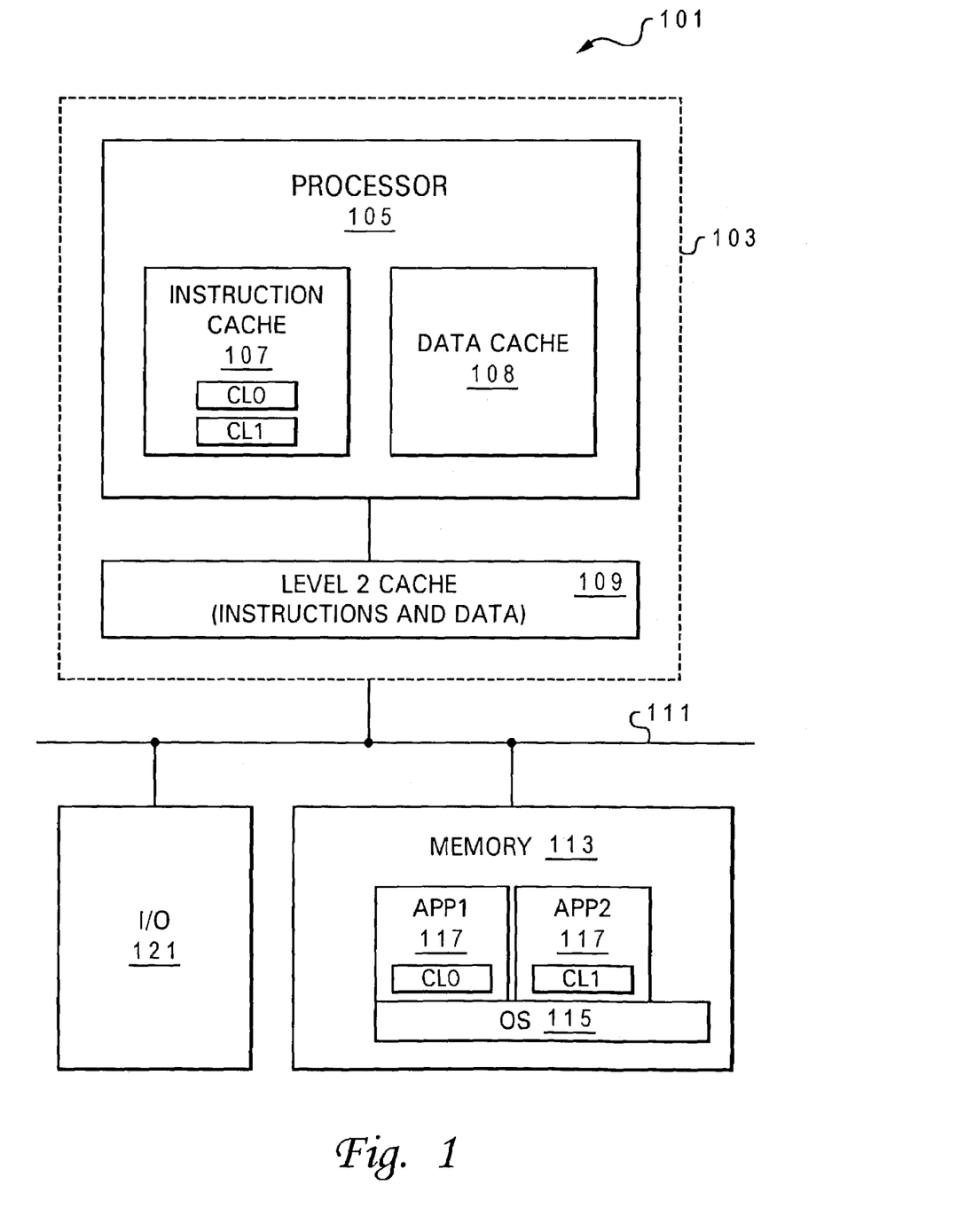
FIG. 1 is a block diagram of a data processing system which the features of the invention may advantageously be implemented.

With reference now to the figures and in particular with reference to FIG. 1, there is illustrated a block diagram of the main components of a data processing system within which the features of the invention may advantageously be implemented. Data processing system 101 includes processing unit 103, input/output (I/O) devices 121 and memory 113 coupled together via interconnect (or system bus) 111.

Processing unit 103 includes SMT processor 105 having a plurality of registers and execution units (not shown), utilized to execute the program instructions of applications (and OS). In addition to execution units, processor 105 includes on-board instruction cache (I-cache) 107 and data cache (D-cache) 108. These I-cache 107 and D-cache 108 are referred to as "on-board" since they are integrally packaged with the registers and execution units of processor 105 and respectively include instructions and data retrieved from memory 113.

Stored within memory 113 are software program code, including operating system (OS) 115 and first and second applications 117 (app1 and app2). Program instructions of each application 117 are executed as threads by processor 105 to complete the application's processes/tasks. In order to execute the applications, some of the instructions of the particular application are fetched from memory and stored within the I-cache 107 until requested by processor 105.

According to the invention, processor 105 operates as a simultaneous multi-threaded processor and schedules threads of both first and second application 117 for execution. When a thread is being scheduled, the processor issues a request for the instructions of that thread which are then fetched from I-cache 107 (or L2 cache 109, or memory 113) and sent to the execution units for processing.

Figure 2:
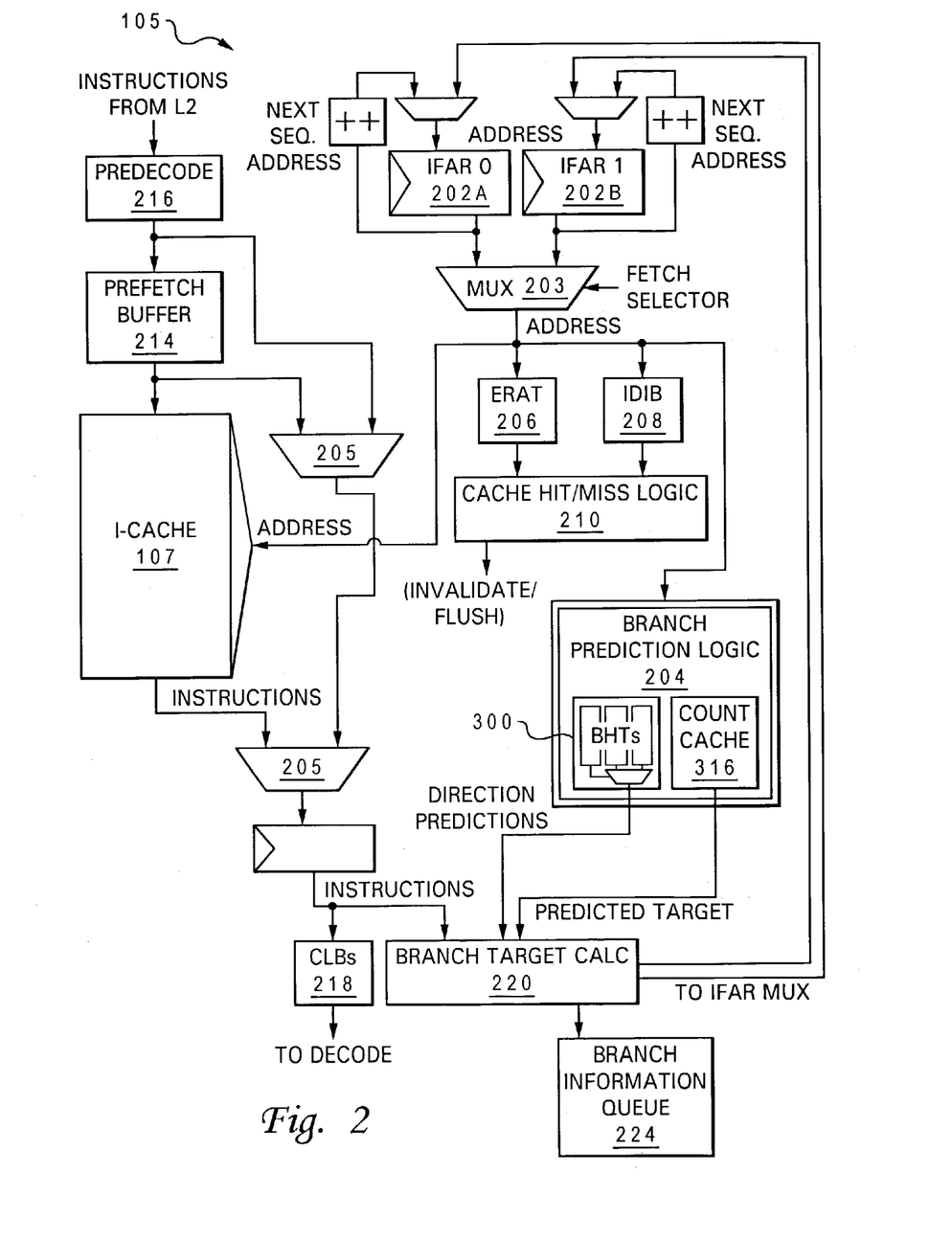
FIG. 2 is a block diagram of a the branch prediction sub-system within processor of the data processing system of FIG. 1 in which the mode switching of the prediction arrays and other features of the invention are provided.

Referring now to FIG. 2, there are illustrated several of the internal components of SMT processor 105, which are utilized in branch prediction. For simplicity the main components are described according to their functional purpose rather than their specific connectivity to each other. Those skilled in the art will appreciate that other configurations of processor components are possible and thus the specific connectivity illustrated should not be considered as limiting on the invention.

FIG. 2 and the remainder of the application are described with reference to two threads concurrently running on processor 105, namely thread 0 (Th0) and thread 1 (Th1). Each new instruction address for Thread 0 is placed in Instruction Fetch Address Register (IFAR) 0 202A. Similarly, each new instruction address for Thread 1 is placed in IFAR 1 202B. In the present embodiment, the instruction address specifies a group (or cache line) of 8 instructions. Multiplexer (MUX) 203 is controlled by "fetch selector" to alternate every cycle between choosing Th0 IFAR 0 202A and Th1 IFAR 1 202B.

The instruction address (or partial address) goes to the Effective to Real Address Translation table (ERAT 206), to the directory of the instruction cache (I-Dir 208), the L1 Instruction Cache (I-Cache 107) as well as the branch prediction logic 204. Branch prediction logic 204 comprises BHTs 300 and count cache 316.

Cache/ERAT hit/miss logic 210 determines whether the requested instructions are presently in L1 Instruction Cache 107 or Prefetch Buffer 214. If they are not, a "Cache Miss" is generated, and there is a delay until the instructions come from the L2 Cache (indicated by arrow labeled "from L2") into Predecode register 216.

If the requested instructions are in L1 I-Cache 107, the group of instructions is scanned for any branches, and target addresses are calculated (or predicted) for those branches which were predicted taken. This scanning and calculation of prediction address is completed at branch target calculator 220. Prediction is completed for each of the instructions before it is known whether the instruction is a branch. The target address is guessed for certain types of branch instruction where the possibility of calculating the target address is unlikely at the time the instruction is fetched.

After detecting that some of the 8 instructions are branches, information about those branches is written into a Branch Information Queue (BIQ) 224. In the event that a branch was predicted wrong, information is retrieved from the BIQ 224 to restore the states of the branch prediction logic 204 and the BIQ 224 to the states that they would have been in had the branch been predicted correctly. Any instructions that followed the mispredicted branch are discarded. Any information in the BIQ 224 about branches that followed the mis-predicted branch is likewise discarded. Although processor 105 comprises many additional function blocks, these blocks are not relevant to prediction and thus not illustrated nor described herein.

The above illustrations and descriptions of data processing system 101 and processor 105 are meant solely for illustrative purposes and not intended to be limiting on the invention. Those skilled in the art would further appreciate that there are other components that might be used in conjunction with those shown in the above figures.

Figure 3A:
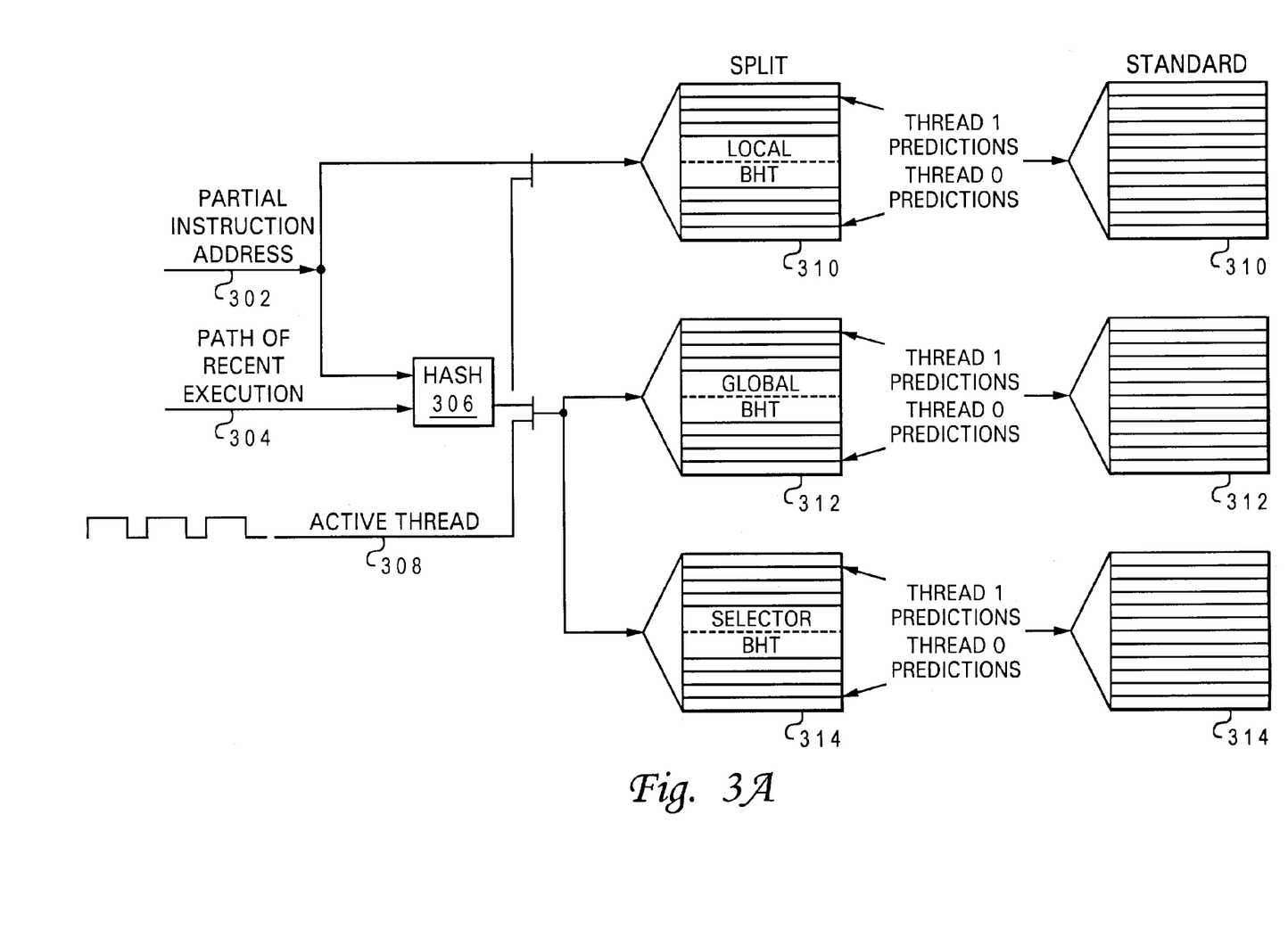
FIGS. 3A and 3B are respective block diagrams of the BHTs and count cache of branch prediction logic of FIG. 2 in split mode to accommodate SMT when required and unified mode according to one embodiment of the present invention.
Figure 3B:
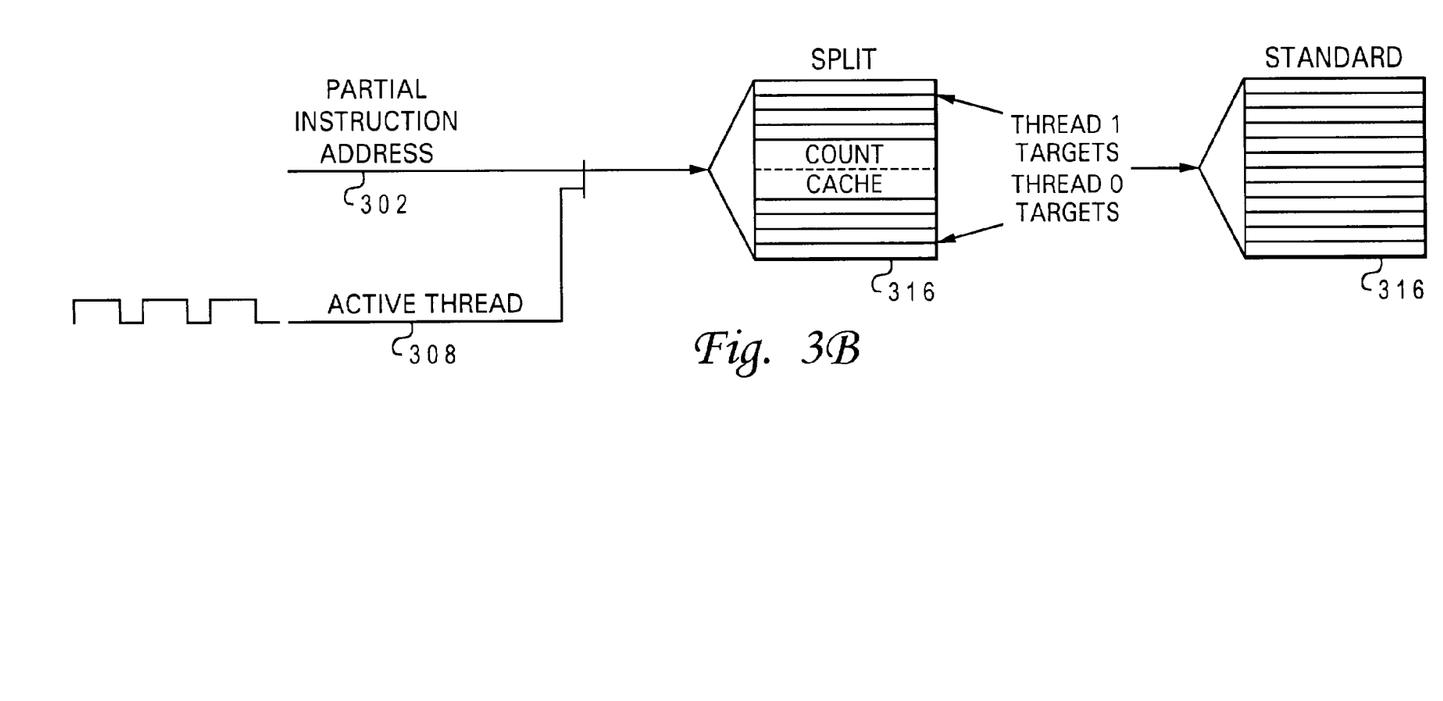

With reference now to FIGS. 3A and 3B, there are illustrated internal components of branch prediction logic 204 of FIG. 2. The features of the invention primarily takes place within Branch Prediction Logic 204. Branch Prediction Logic 204 contains 3 Branch History Tables (BHTs) (illustrated in FIG. 3A), which (in the illustrative embodiment) associate bits 48:58 of the instruction address from the IFAR with a direction prediction. BHTs include local BHT 310, global BHT 312, and selector BHT 314.

As illustrated by FIG. 3B, Branch Prediction Logic 204 also contains a count cache 316, which associates a target address with the instruction address for certain types of branch. Count cache 316 is utilized for a class of branch where the target is calculated separately and moved to a special register called the count register. Often this calculation has not been done at the time when the target address is needed. Because branches tend to repeat themselves, count cache 316 is utilized to remember a target address by associating the address with a previously seen branch address. BHTs 310, 312, 314 are updated to reflect the new direction, and if count cache 316 was used and predicted the wrong target, count cache 316 gets updated to associate the branch address with the new target address.

FIG. 3A illustrates BHTs 310, 312, 314 in standard (unified) and split-BHT mode receiving inputs of partial instruction addresses 302, path of recent execution 304 and the active thread 308. A hash 306 is generated from the address 302 and path of recent execution 304. The invention introduces the split-BHT mode for SMT processing. In split-BHT mode, the most significant bit of the index (i.e., lower order addresses) into a BHT is replaced with the thread identifier (ID), so that branches of Th0 occupy the lower half of the BHT and branches of TH1 occupy the upper half of the BHTs 310, 312, 314 as shown in FIG. 3A. The assignment of a specific half (upper or lower) of the BHTs 310, 312, 314 may be reversed in another embodiment, and the functionality of the invention is not dependent on a specific implementation each thread is assigned. The implementation may also be expanded to replace or append more than one significant bit of the index if the processor were expanded to handle more than two threads.

Figure 3C:
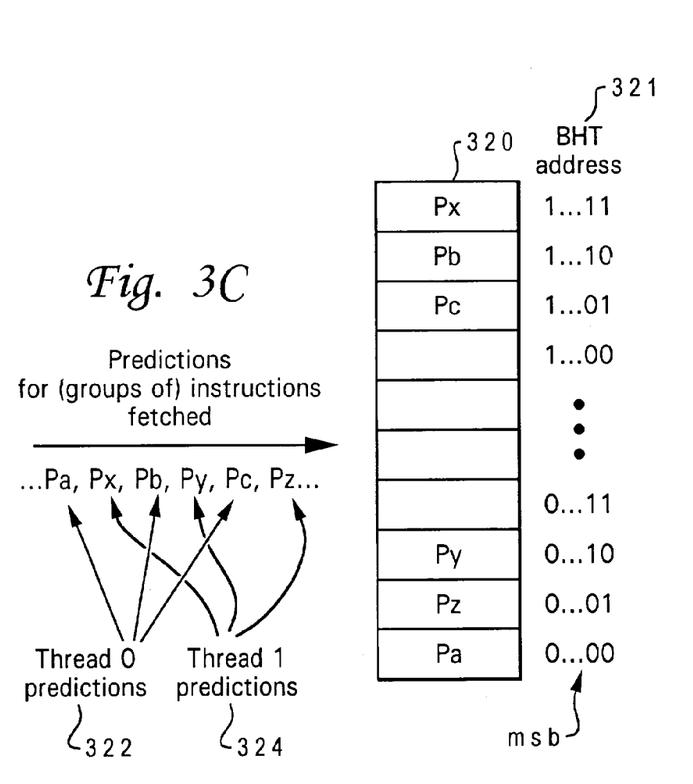
FIGS. 3C and 3D are respective block diagrams of one array within BHTs and count cache in a unified mode and in a split mode, respectively, according to one embodiment of the present invention.

Likewise, as illustrated by FIG. 3B, count cache 316 may exist in either standard or split mode. When count cache 316 is operated in split-count cache mode, the most significant bit of the index into the count cache is replaced with the thread ID, as shown in FIG. 3C (described below), so that branches of Th0 occupy the lower half of count cache 316 and branches of TH1 occupy the upper half of the count cache 316. When in the split mode, one less low order bits utilized to identify the branch address since the highest order bit is assigned as the Thread ID bit (in the two thread example).

FIG. 3C provides an internal view of the allocation of "bits" of an array 320 of branch prediction logic operating in a unified mode. Array 320 may represent any one of BHTs 310, 312, 314 and count cache 316. Array 320 is indexed by lower order addresses 321, each of which has a most significant bit of either 0 or 1. Th0 and Th1 predictions 322, 324 serve as inputs to array 320. These inputs are indexed by the entire lower order bit addresses and can occupy any register within array 320. Thus, for example, Th0 predictions, Pa, Pb, and Pc, occupy registers indexed by lower order addresses at the bottom and near the top of the array 320. Since lower order address can be shared by both Th0 and Th1, some overlap may occur in the unified array 320 when operated in a unified mode.

Figure 3D:
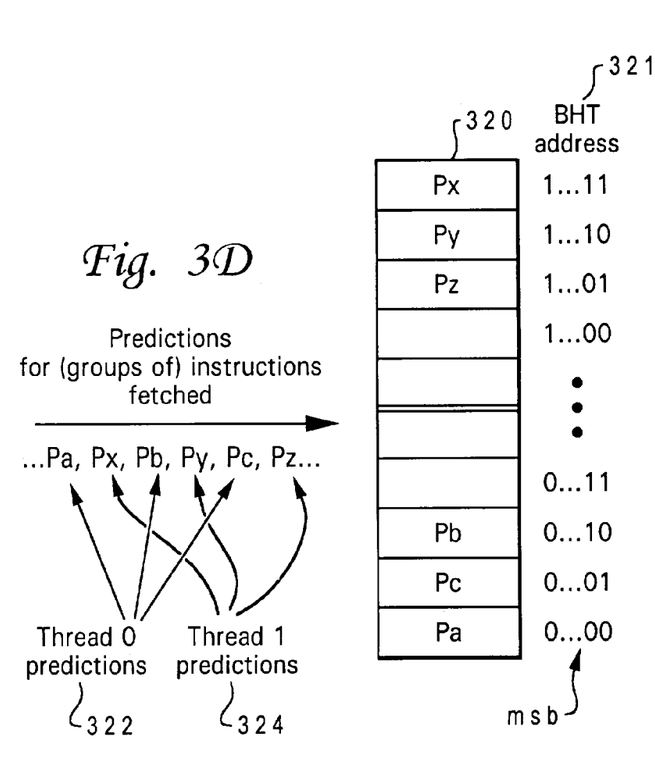

In contrast with FIG. 3C, FIG. 3D provides an internal "bit" view of array 320, when operating in split mode (i.e., split-BHT and split-count cache). As can be seen, the most significant bit of the lower order addresses to the top of the array 320 (i.e., 1) is utilized to indicate the ID for Th1 predictions 324, while the most significant bit of the lower order addresses to the bottom of the array 320 (0) is utilized to indicate the ID for Th0 predictions 322. Thus, all Th0 predictions 322 are placed within the lower half of the array 320, and all Th1 predictions 324 are placed in the upper half of the array 320. Because each thread is scheduled in an alternating manner by the fetch selector, the branch prediction logic is aware of which thread is scheduled at a given time and to which thread the branch and target addresses being generated belong. The address information is thus directed to the particular portion/half of the BHTs 310, 312, 314 and count cache 316 assigned to that thread.

Figure 4A:
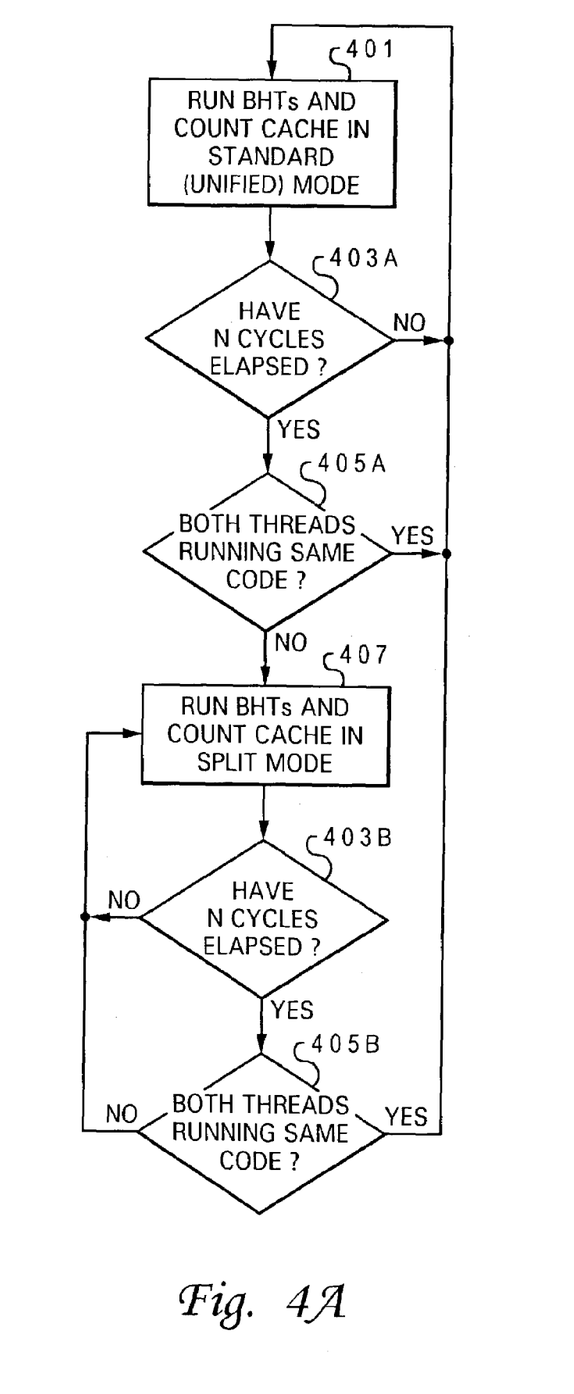
FIGS. 4A and 4B are logic flow diagrams illustrating two processes involved in selecting which mode to operate the BHTs and count cache in during SMT execution according to the present invention.
Figure 4B:
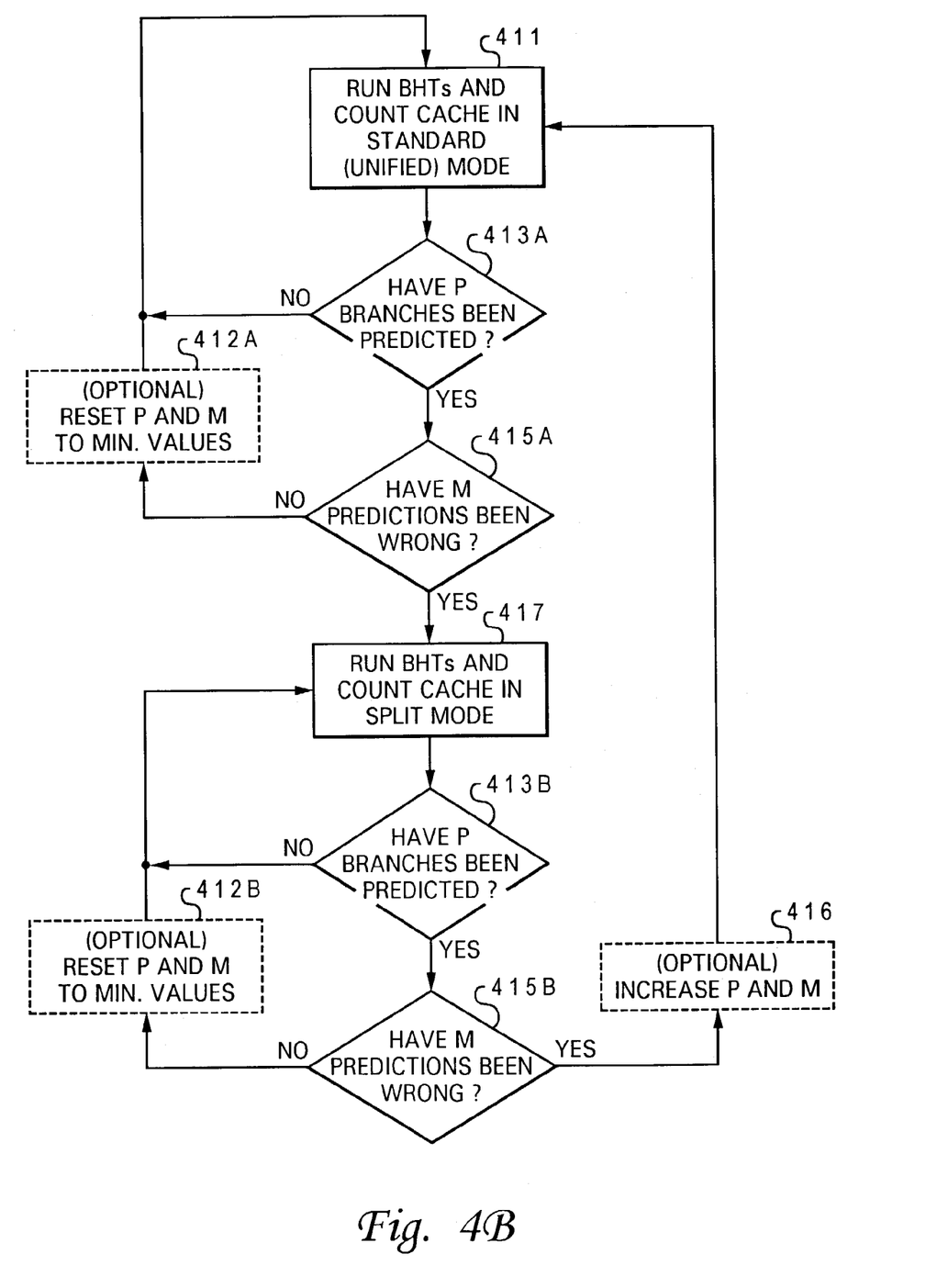

With reference now to FIG. 4A and 4B, there are illustrated two processes by which the branch control logic switches the configuration of the BHT and count cache between standard (unified) BHT and standard (unified) count cache mode and split-BHTs and split-count cache mode according to one embodiment. The process of FIG. 4A begins at block 401 with the BHTs and count cache running standard mode (i.e., not split mode) and branch prediction proceeding and updating the entries in the BHTs and count cache. A first check is made as indicated at block 403A whether a pre-set number of cycles has elapsed. The pre-set number of cycles is pre-determined/calculated to substantially reduce any thrashing that may occur whenever the switching of modes occurs within the BHTs and count cache. When the pre-set number of cycles have elapsed, a determination is made as sown at block 405A, whether both threads are running the same code. If both threads are running the same code, branch prediction and updates to the BHT and count cache proceed as normal in unified mode.

If, however, each thread is running different code (i.e., the unified monitored condition has occurred), branch control logic runs the BHTs and count cache in split mode as indicated at block 407. Then a check is made as indicated at block 403B whether the pre-set number of cycles has elapsed. When the preset number of cycles have elapsed, a next determination is made whether both threads are running the same code as shown at block 405B, and the operating mode for the BHTs and count cache is switched back to unified mode if the threads are running the same code.

Notably, the determination of whether or not both threads are running the same code, which results in the switching between modes is completed utilizing one or more methods, involves monitoring for certain pre-established conditions, whose occurrence signals the branch prediction logic that different (or similar) code is being run.

In one embodiment, the pre-established condition involves tracking the number of updates in the effective address directory (EA Dir) in a given interval (e.g., the pre-established number of cycles). The number of updates within that interval is then compared to a pre-set threshold. When the number exceeds the threshold, an assumption is made that the frequent swapping is due to non-shared code and the slit-mode is implemented.

With this embodiment, only problem state EA Dir updates are considered, as shared code in Hypervisor state is expected. Problem state EA Dir updates include updates resulting from program applications running on the processor with a limited range of addresses within which the application has to be assigned. The control logic looks at the EA Dir updates to see if instructions are frequently being swapped, indicating non-shared code. Shared code in hypervisor state is expected, and with the hypervisor mode, an executive OS is permitted to run on any address (i.e., no restrictions or ranges). Following the comparison, depending on whether or not the threshold is exceeded, split-BHT and split-count cache mode is enabled or disabled.

In another embodiment, a software notification is generated. The shared page bit in the segment look-aside buffer (SLB) is monitored. When the bit is set, the page is being shared between threads and the unified modes is implemented. The SLB maps the virtual address to the real address and operates as a directory to a higher-level cache that includes shared cache indications (via the setting of the bit).

FIG. 4B illustrates the process of a third embodiment that involves utilization of a performance monitor, which tracks a variety of events and conditions in real time. The performance monitor tracks the prediction accuracy (correct versus incorrect) including predicting (i) right direction, wrong target, (ii) right target, wrong direction, etc. Specifically, as illustrated in FIG. 4B, the performance monitor is utilized to compare a mis-predict count to a threshold, M, every P predicted branches. This yields a misprediction rate without the need for division. Feedback generated from the performance monitor is utilized to determine whether split or unified mode is best. That is, if the mis-predict rate exceeds the threshold, M, the mode is switched. Notably also, this implementation may be combined with either of the above embodiments and utilized as an additional condition for making a mode switch.

Returning now to FIG. 4B, as indicated at block 411, the BHTs and count cache are run in standard/unified mode. A determination is then made at block 413A whether a set number, P, of branches have been predicted. When the set number of branches have been predicted a next determination is made at block 415A whether at least a certain number, M, of the P predicted branches have been predicted incorrectly. Thus, if M or more predictions have been wrong, the prediction is clearly faulty, and the BHTs and count cache are then run in split mode as shown at block 417. A next determination is then made at block 413B whether the preset number of branches have been predicted since the mode switch. When the preset number of branches have been predicted a check is made at block 415B whether at least M predictions have been wrong. When M or more predictions of the preset number of predictions have been wrong, the BHTs and count cache are switched back to unified mode.

Utilization of the parameters, P and M, enables some dynamic adjustment in determining when to switch modes for the BHTs and count cache. These adjustments are optional and illustrated as dashed blocks 412A, 412B and 416. When, after switching the mode, the mis-predict rate does not improve after the next P branches, the mode is switched again; however the values of both P and M are increased up to some pre-established maximum Pmax and Mmax (blocks 416). Also, if at some point the rate does improve, both P and M are reset to their original values, Pmin and Mmin, respectively (blocks 412A and 412B). By adjusting the values of P and M, the intervals between mode switches is lengthened when it appears that neither method is working well. This lengthening of the intervals reduces the penalty incurred when switching modes. When the process of switching modes begins to result in lower mispredict rates, the intervals are reverted back to the original (shorter) length.

Since some of the prediction addresses written in BHTs 310, 312, 314 and count cache 316 in unified mode may no longer be available or correct in split mode, switching from unified to split mode (or from split mode to unified) means that in the worst case up to one half of the branch/target addresses may become incorrect. Because branches are most frequently not-taken, the actual portion of BHT addresses that map to an incorrect predictor following a mode switch should be fewer than 25%. However, the information in the table is frequently updated, so incorrect information does not persist. The less frequently the switching between operating modes occurs, the less likely mispredicts due to mode switching will erode the gains achieved by the new mode. In the illustrative embodiment, the periodic monitoring and switching would only occur approximately every 50,000 cycles to avoid thrashing, and then the operating mode adapted is based on the occurrence of certain pre-established conditions.

While the invention has been particularly shown and described with reference to a preferred embodiment, it will be understood by those skilled in the art that various changes in form and detail may be made therein without departing from the spirit and scope of the invention. For example, although the invention is described by way of embodiments with an SMT processor scheduling two threads, the invention may be implemented in SMT processors adapted to concurrently schedule more than two threads.

What is claimed is:

1. In a processor that performs simultaneous multi-threading (SMT) and which includes branch processing logic that has at least one branch history table (BHT) and a predicted target address cache (count cache), a method for improving branch prediction within an SMT environment wit a first thread and a second thread sharing similar lower order addresses, the method comprising:
   updating said BHT and said count cache as unified arrays when said first thread and said second thread share a same code; and
   dynamically allocating a first contiguous half of said BHT and of said count cache to said first thread and a second contiguous half of said BHT and said count cache to said second thread, wherein the dynamically allocating to different contiguous halves is triggered only when said first tread and said second thread do not share the same code and wherein the BHT and count cache resume being updated as unified arrays when a next executed pair of threads shares the same code.

2. The method of claim 1, further comprising:
   assigning a highest bit of an index to said array as a thread identifier (ID), wherein for SMT involving only said first thread and said second thread, said first thread is assigned an ID of 1 and said second thread is assigned and ID of 0, wherein when there are additional threads that do not share the same code being simultaneously executed, a first two or more highest bits of the index are utilized to assign unique IDs of each thread; and
   tagging a highest bit of each lower order prediction address from said first thread and said second thread to reference said index having the ID assigned to the thread updating the BHT and the count cache.

3. The method of claim 2, further comprising updating a corresponding half of said BHT and said count cache logically allocated to the thread updating the BHT and the count cache utilizing an index having one less high bit.

4. The method of claim 2, further comprising allocating received prediction addresses to a half of said BHTs and said count cache corresponding to which thread among said first thread and said second thread is currently being executed.

5. The method of claim 1, further comprising:
   determining when a pre-established number of clock cycles have elapsed; and
   when said predetermined number of clock cycles have expired, evaluating whether both said first thread and said second thread are running the same code; and
   switching an operating mode from unified to split and from split to unified only after said predetermined number if cycles have elapsed.

6. The method of claim 5, wherein said evaluating includes checking a shared page bit in the segment lookaside buffer (SLB).

7. The method of claim 5, wherein said evaluating includes:
   tracking a number of updates in an effective address directory (EA Dir) in a set interval;
   comparing said number of updates to a pre-established threshold; and
   when said number of updates within the set interval exceeds the threshold, initiating a switch to a different mode.

8. The method of claim 5, wherein said evaluating step includes:
   tracking a prediction rate of current operating mode;
   when the prediction rate exceeds a pre-established error threshold, initiating a switch of said mode.

9. The method of claim 8, wherein said tracking includes:
   tracking a number of mis-predict over a pre-set number of predicted branches;
   when the number of mis-predicts does not fall below a pre-established threshold, increasing said pre-set number of predicted branches up to a maximum number; and
   when the number of mis-predicts falls below the pre-established threshold following said increasing step, reducing said pro-set number of predicted branches.

10. In a processor that performs simultaneous multi-threading (SMT) and which includes branch processing logic that has at least one branch history table (BHT) and a predicted target address cache (count cache), a system for improving branch prediction within an SMT environment wit a first thread and a second thread sharing similar lower order addresses, the system comprising:
    means for updating said BHT and said count cache as unified arrays when said first thread and said second tread share code; and
    means for dynamically allocating a first contiguous half of said BHT and of said count cache to said first thread and a second contiguous half of said BHT and said count cache to said second thread, wherein the dynamically allocating to different contiguous halves is triggered only when said first thread and said second thread do not share the same code and wherein the BHT and count cache resume being updated as unified arrays when a next executed pair of threads shares the same code.

11. The system of claim 10, further comprising:
    means for assigning a highest bit of an index to said away as a thread identifier (ID),
    wherein for SMT involving only said first thread and said second thread, said first thread is assigned an ID of 1 and said second thread is assigned and ID of 0; and
    means for tagging a highest bit of each lower order prediction address from said first thread and said second thread to reference said index having the ID assigned to the thread updating to BHT and to count cache.

12. The system of claim 11, further comprising means for updating a corresponding half of said BHT and said count cache logically allocated to the thread updating the BHT and the count cache utilizing an index having one less high bit.

13. The system of claim 11, further comprising means for allocating received prediction addresses to a half of said BHTs and said count cache corresponding to which thread among said first thread and said second thread is currently being executed.

14. The system of claim 10, further comprising:
    means for determining when a pre-established number of clock cycles have elapsed; and means, when said predetermined number of clock cycles have expired, for evaluating whether both said first thread and said second thread are running the same code; and means for switching an operating mode from unified to split and from split to unified only after said predetermined number if cycles have elapsed.

15. The system of claim 14, wherein said evaluating means includes means for checking a shared page bit in the segment look-aside buffer (SLB).

16. The system of claim 14, wherein said evaluating means includes:

means for tracking a number of updates in an effective address directory (EA Dir) in a set interval;

means for comparing said number of updates to a pre-established threshold; and means, when said number of updates within the set interval exceeds the threshold, for initiating a switch to a different mode.

17. The system of claim 14, wherein said evaluating means includes:

means for tracking a prediction rate of current operating mode;

means, when the prediction rate exceeds a pre-established error threshold, for initiating a switch of the current operating mode.

18. The system of claim 17, wherein said tracking means includes:

means for tracking a number of mis-predict over a pre-set number of predicted branches;

means, when the number of mis-predicts does not fall below a pre-established threshold, for increasing said pre-set number of predicted branches up to a maximum number; and means, when the number of mis-predicts falls below the pre-established threshold following said increasing step, for reducing said pre-set number of predicted branches.

19. A data processing system tat provides thread-specific branch prediction in a simultaneous multithreading (SMT) processing environment having a first thread and a second thread, said processing system comprising:

an SMT processor that includes at least one branch history table (BHTs) and a predicted target address cache (count cache), for respectively tracking predictions and target addresses generated for branch prediction mechanism;

a memory coupled to said processor and from which code for said first and said second thread is retrieved by said SMT processor;

means for coupling said memory to said processor; and means, within said SMT processor for:

tracking predictions and targets of the first thread and the second thread in a unified view of the BHT and the count cache whenever the first thread and second thread shares the same code;

dynamically splitting an indexed array of said BHT and of said count cache into two logically separate partitions for individually tracking predictions and targets of said first thread and said second thread in separate partitions when the first thread and the second thread do not share the same code, such that more accurate prediction is achieved; and dynamically returning to tracking a next pair of threads executing on the processor via the united view of the BHT and the count cache when the next pair of threads shares the same code.

20. The data processing system of claim 19, wherein said processor further comprises:

means for updating said BHT and said count cache as unified arrays when said first thread and said second thread share code; and means for logically allocating a first contiguous half of said BHT and of said count cache to said first tread and a second contiguous half of said BHT and said count cache to said second thread, when said first thread and said second thread do not share the same code.

21. The data processing system of claim 20, further comprising:

means for assigning a highest bit of an index to said array as a thread identifier (ID), wherein for SMT involving only said first tread and said second tread, said first tread is assigned an ID of 1 and said second thread is assigned and ID of 0; and means for tagging a highest bit of each lower order prediction address from said first tread and said second thread to reference said index having the ID) assigned to the tread updating the BHT and the count cache.

22. The data processing system of claim 21, further comprising means for updating a corresponding half of said BHT and said count cache logically allocated to the tread updating the BHT and the count cache utilizing an index having one less high bit.

23. The data processing system of claim 21, further comprising means for allocating received prediction addresses to a half of said BHTs and said count cache corresponding to which thread among said first thread and said second thread is currently being executed.

24. The data processing system of claim 20, further comprising:

means for determining when a pre-established number of clock cycles have elapsed; and means, when said predetermined number of clock cycles have expired, for evaluating whether both said first tread and said second thread are running the same code; and means for switching an operating mode from unified to split and from split to unified only after said predetermined number if cycles have elapse.

25. The data processing system of claim 24, wherein said evaluating means includes means for checking a shared page bit in the segment look-aside buffer (SLB).

26. The data processing system of claim 24, wherein said evaluating means includes:

means for tracking a number of updates in an effective address directory (EA Dir) in a set interval;

means for comparing said number of updates to a pre-established threshold; and means, when said number of updates within the set interval exceeds the threshold, means for initiating a switch to a different mode.

27. The data processing system of claim 24, wherein said evaluating means includes:

means for tracking a prediction rate of current operating mode;

means, when the prediction rate exceeds a pre-established error threshold, for initiating a switch of the current operating mode.

28. The data processing system of claim 27, wherein said tracking means includes:

means for tracking a number of mis-predict over a pre-set number of predicted branches;

means, when the number of mis-predicts does not fail below a pre-establishedthreshold, for increasing said pre-set number of predicted branches up to a maximum number;and means, when the number of mis-predicts falls below the pre-established thresholdfollowing said increasing step, for reducing said pre-set number of predicted branches.

* * * * *